US012782575B2

(12) United States Patent
Khubchandani et al.

(10) Patent No.: US 12,782,575 B2
(45) Date of Patent: Nov. 3, 2026

(54) TECHNIQUES FOR POINT CLOUD DATA SHARING BETWEEN LIDAR SYSTEMS

(71) Applicant: AEVA, INC., Mountain View, CA (US)

(72) Inventors: Teju Khubchandani, San Jose, CA (US); Mina Rezk, Haymarket, VA (US)

(73) Assignee: AEVA, INC., Mountain View, CA (US)

( * ) Notice: Subject to any disclaimer, the term of this patent is extended or adjusted under 35 U.S.C. 154(b) by 797 days.

(21) Appl. No.: 18/299,911

(22) Filed: Apr. 13, 2023

(65) Prior Publication Data

US 2024/0345250 A1 Oct. 17, 2024

(51) Int. Cl.
*G01S 17/89* (2020.01)
*G01S 7/00* (2006.01)

(52) U.S. Cl.
CPC .............. *G01S 17/89* (2013.01); *G01S 7/003* (2013.01)

(58) Field of Classification Search
CPC ........ G01S 17/89; G01S 7/003; G01S 7/4808; G01S 17/34; G01S 17/42; G01S 17/58; G01S 17/86; G01S 17/87; G01S 17/931
See application file for complete search history.

(56) References Cited

U.S. PATENT DOCUMENTS

| | | | | |
|---|---|---|---|---|
| 11,263,804 | B1 * | 3/2022 | Bogacz | G06T 15/20 |
| 11,585,923 | B2 * | 2/2023 | Taalimi | G06N 7/01 |
| 11,741,661 | B2 * | 8/2023 | Lasram | G06T 19/00 345/427 |
| 2020/0301799 | A1 * | 9/2020 | Manivasagam | G01S 7/497 |
| 2022/0057494 | A1 * | 2/2022 | Viswanatha | G01S 17/34 |
| 2022/0406014 | A1 * | 12/2022 | Ma | G01S 17/89 |
| 2023/0025981 | A1 * | 1/2023 | Lee | G01S 13/584 |
| 2023/0244815 | A1 * | 8/2023 | Herman | G06V 40/168 726/26 |
| 2024/0144694 | A1 * | 5/2024 | Alismail | B60W 60/001 |
| 2024/0248209 | A1 * | 7/2024 | Deng | G01S 17/89 |
| 2024/0312058 | A1 * | 9/2024 | Omar | G06T 7/73 |

OTHER PUBLICATIONS

Li et al., "Bridging the Gap Between Point Cloud Registration and Connected Vehicles" (Year: 2022).*

* cited by examiner

*Primary Examiner* — Assres H Woldemaryam
(74) *Attorney, Agent, or Firm* — Womble Bond Dickinson (US) LLP

(57) ABSTRACT

A first light detection and ranging (LIDAR) system includes an optical source to transmit one or more optical beams towards a first field of view, an optical receiver to receive one or more return beams corresponding to the first field of view and generate a first point cloud referencing a first field of view of the first lidar system, a processing device, and a memory to store the first point cloud and store instructions. The instructions, when executed by the processing device, cause the first LIDAR system to receive a second point cloud referencing a second field of view of a second LIDAR system, determine a relative positioning between the first field of view and the second field of view, and modify the first point cloud based on the second point cloud and the relative positioning between the first field of view and the second field of view.

17 Claims, 12 Drawing Sheets

TECHNIQUES FOR POINT CLOUD DATA SHARING BETWEEN LIDAR SYSTEMS

FIELD OF INVENTION

The present disclosure is related to light detection and ranging (LIDAR) systems in general, and more particularly to sharing point clouds between LIDAR systems.

BACKGROUND

LIDAR systems, such as frequency-modulated continuous-wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal (e.g., a returned optical signal), delayed by the round-trip time to the target and back, generates signals at the receiver with frequencies that are proportional to the distance to each target in the field of view of the system. An up sweep of frequency and a down sweep of frequency may be used to detect a range and velocity of a detected target.

Because LIDAR systems utilize reflected light from a target, objects that are obscured may not reflect light, and may not be detected by the LIDAR system. Moreover, the LIDAR system may be operationally limited by a distance over which the light may travel. Thus, objects that are at greater distances from the LIDAR system may not be detected, or may be detected at a lower resolution.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

Figure 1:
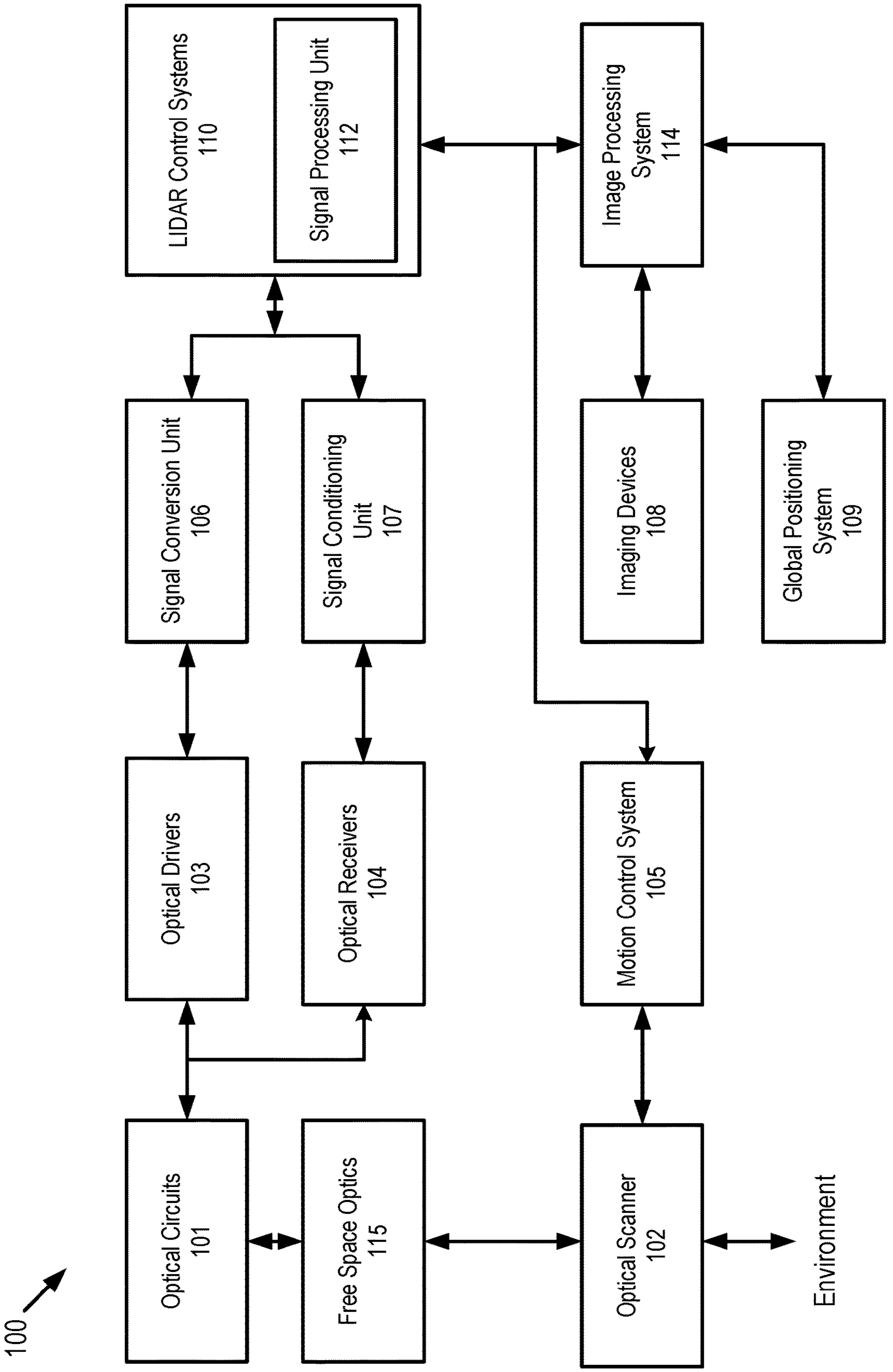
FIG. 1 is a block diagram of an example LIDAR system according to some embodiments of the present disclosure.

The present disclosure describes various examples of LIDAR systems and methods for detecting a distance and relative speed of objects. More specifically, the present disclosure described improved techniques for performing measurement of distance and speed of one or more target objects using multiple LIDAR systems.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

The present disclosure describes various examples of LIDAR systems capable of sharing data points of a point cloud and methods for sharing data points between LIDAR systems. LIDAR systems detect objects based on optical signals (e.g., lasers) reflecting from the objects, with the reflected laser signals received by the LIDAR system and processed to generate a point cloud. LIDAR systems may be limited in their ability to detect objects that are obscured by other objects, or are beyond a workable range of the optical signals used by the LIDAR systems.

For example, if a first target object is located behind a second object, optical signals from the LIDAR system will reflect off the second object rather than the first target object. As a result, the generated data points of the point cloud will not include data points corresponding to the first target object. In addition, an ability of a LIDAR system may be dependent on the range of the target object. For example, as the range of the target object increases, an effectiveness of a LIDAR system may be reduced because the back-scattered optical signal weakens with target range. As a result, returns from very distant targets may be too weak and/or noisy for a photoreceiver of the LIDAR system to detect accurately.

The present disclosure solves the above issues associated with limitations of LIDAR systems by providing a mechanism to augment the data points detected by a first LIDAR system with data points from a second LIDAR system. For example, a first LIDAR system may communicate (e.g., over a network) with a second LIDAR system, and request a portion or all of a point cloud generated by the second LIDAR system. The first LIDAR system may use a location of the second LIDAR system and/or a common object within the field of view of both LIDAR systems as a guide to assist in integrating the point cloud of the second LIDAR system into the first LIDAR system's own point cloud.

Sharing data points between LIDAR systems may allow for a given LIDAR system to expand, enhance, and/or confirm its own point cloud. For example, if a first LIDAR system has a field of view (FOV) that is obscured, the first LIDAR system may request the point cloud from the second LIDAR system to obtain points in the obscured portion of the FOV, to expand the point cloud. As another example, the first LIDAR system may request the point cloud of a second LIDAR system to confirm an object that the first LIDAR system has detected, for example in a situation in which the second LIDAR system has a different point of view of the target. As another example, the first LIDAR system may have a portion of its field of view in which the data points associated with a target are at a lower resolution, such as due to the distance of the target. The first LIDAR system may request the point cloud from the second LIDAR system that may be closer to the target so as to obtain additional points that may provide further detail and/or resolution related to the target.

The ability to share data points improves the technology associated with LIDAR systems. By sharing data points between LIDAR systems, a point cloud of a given LIDAR system may be improved and/or expanded without having to add additional equipment or increase a power of the optical signals. In addition, by expanding the point cloud, embodiments of the present disclosure may be capable of generating a point cloud including target objects that would otherwise be invisible to the LIDAR system.

FIG. 1 is a block diagram of an example LIDAR system 100 according to some embodiments of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers, or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window, or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, which may be a modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to a collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data (e.g., from global positioning system 109) to provide a precise global location.

Figure 2:
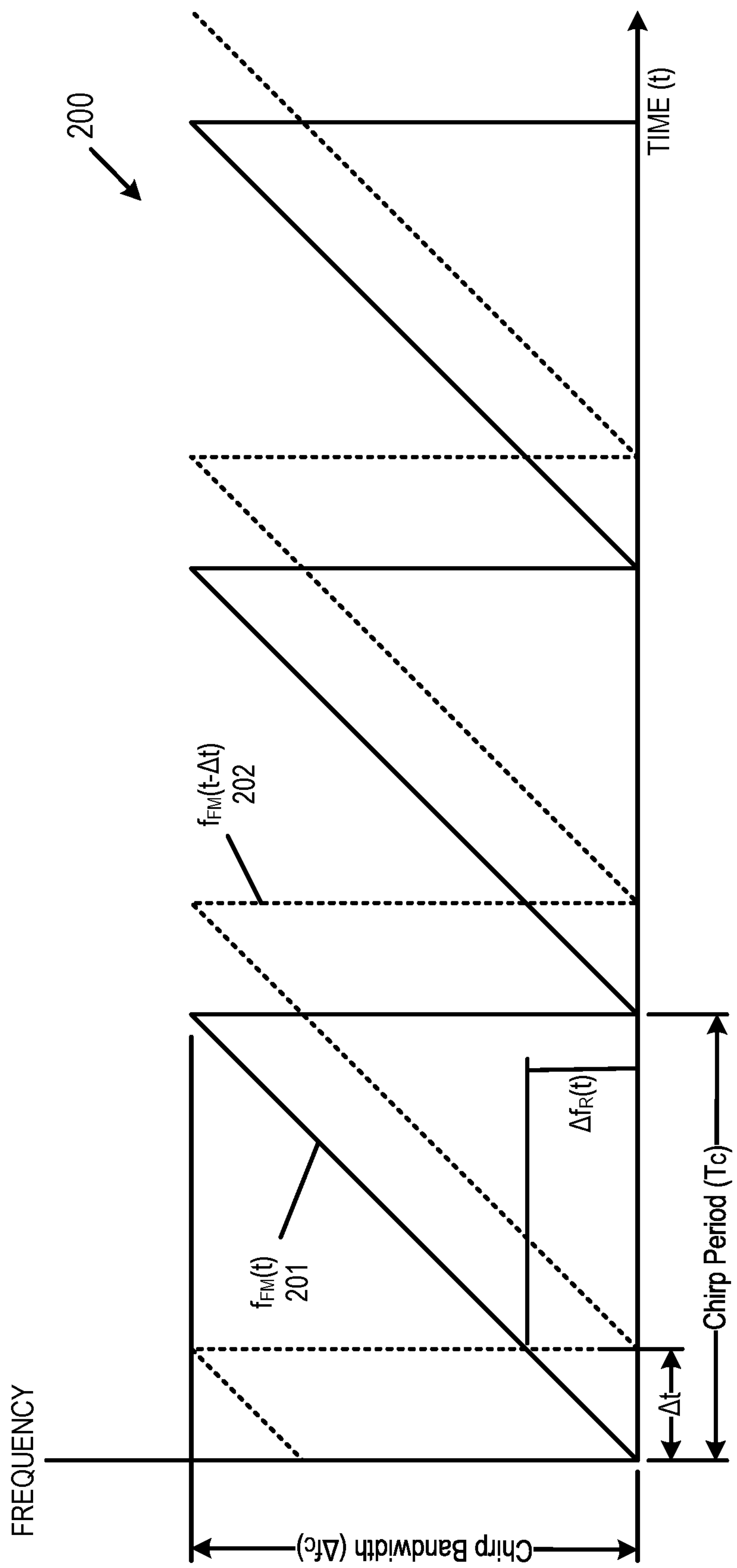
FIG. 2 is a time-frequency diagram of FMCW scanning signals that can be used by a LIDAR system according to some embodiments of the present disclosure.

FIG. 2 is a time-frequency diagram 200 of FMCW scanning signals that can be used by a LIDAR system according to some embodiments of the present disclosure. The FMCW scanning signals 201 and 202 may be used in any suitable LIDAR system, including the LIDAR system 100 of FIG. 1, to scan a target environment. The scanning signal 201 may be a triangular waveform with an up-chirp and a down-chirp having a same bandwidth $\Delta f_s$ and period $T_s$. The other scanning signal 202 is also a triangular waveform that includes an up-chirp and a down-chirp with bandwidth $\Delta f_s$ and period $T_s$. However, the two signals are inverted versions of one another such that the up-chirp on scanning signal 201 occurs in unison with the down-chirp on scanning signal 202.

FIG. 2 is a time-frequency diagram 200 of an FMCW scanning signal 201 that may be used by a LIDAR system, such as the LIDAR system 100, to scan a target environment according to some embodiments. In one example, the FMCW scanning signal 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the FMCW scanning signal 201, where $\Delta t$ is the round trip time to and from a target illuminated by FMCW scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the target return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of LIDAR system 100. The beat frequency $\Delta f_R(t)$ can then be digitized by an analog-to-digital converter (ADC), for example, in a signal conditioning unit such as signal conditioning unit 107 in the LIDAR system 100. The digitized beat frequency signal can then be digitally processed, for example, in a signal processing unit, such as signal processing unit 112 in the LIDAR system 100. It should be noted that the target return signal 202 will, in general, also include a frequency offset (Doppler shift) if the target has a velocity relative to the LIDAR system 100. The Doppler shift can be determined separately, and used to correct the frequency of the return signal 202, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_R$max) is 500 megahertz. This limit in turn determines the maximum range of the system as Rmax=(c/2)($\Delta f_R$max/k) which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
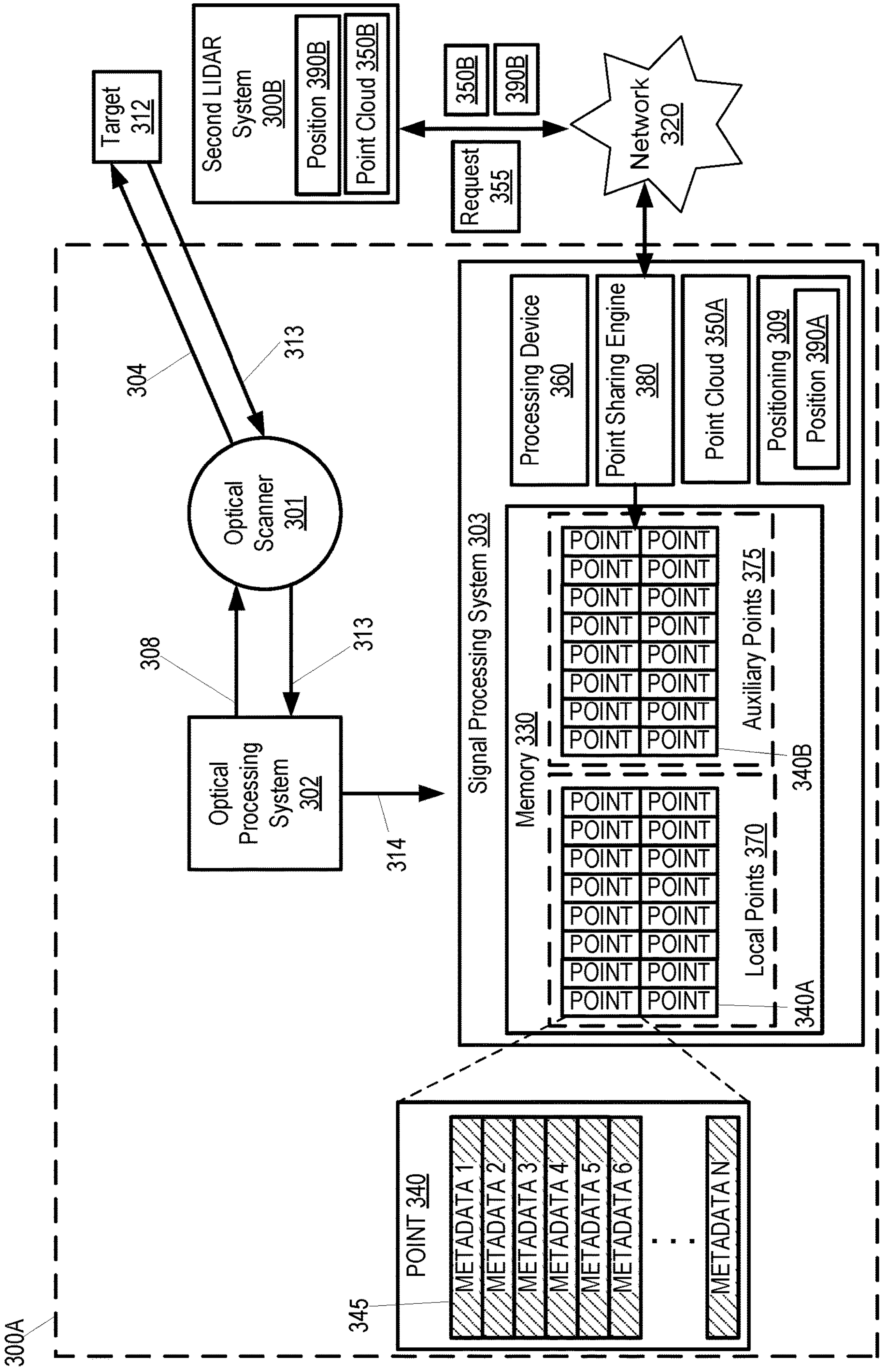
FIG. 3 is a block diagram illustrating an example LIDAR system according to some embodiments of the present disclosure.

FIG. 3 is a block diagram illustrating an example LIDAR system 300A (also referred to herein as a first LIDAR system 300A) according to some embodiments of the present disclosure. A letter after a reference numeral, such as "300A," indicates that the text refers specifically to the element having that particular reference numeral. A reference numeral in the text without a following letter, such as "300," refers to any or all of the elements in the figures bearing that reference numeral. The first LIDAR system 300A may be configured to share a point cloud with a second LIDAR system 300B. Both the first LIDAR system 300A and the second LIDAR system 300B may be configured and/or operate similarly to the LIDAR system 100 described herein.

Example LIDAR system 300A includes an optical scanner 301 to transmit a frequency-modulated continuous wave optical scanning beam 304 to targets such as target 312 and to receive a return signal 313 from reflections of the optical scanning beam 304 from the targets 312 in the FOV of the optical scanner 301. LIDAR system 300A also includes an optical processing system 302 to generate a baseband signal 314 in the time domain from the return signal 313, where the baseband signal 314 contains frequencies corresponding to LIDAR target ranges. Optical processing system 302 may include elements of free space optics 115, optical circuits 101, optical drivers 103 and optical receivers 104 in LIDAR system 100 described herein with respect to FIG. 1. LIDAR system 300A also includes a signal processing system 303 to measure energy of the baseband signal 314 in the frequency domain, to compare the energy to an estimate of LIDAR system noise, and to determine a likelihood that a signal peak in the frequency domain indicates a detected target 312. Signal processing system 303 may include elements of signal conversion unit 106, signal conditioning unit 107, LIDAR control systems 110 and signal processing unit 112 in LIDAR system 100 described herein with respect to FIG. 1.

In some embodiments, optical scanner 301 is configured to scan a target environment with the optical scanning beam 304 through a range of azimuth and elevation angles covering the FOV of the LIDAR system 300A. In some embodiments, the optical scanning beam 304 may include a plurality of individual optical beams 308 that are collimated together and directed to optical scanner 301 to generate the scanning beam 304. The plurality of optical beams 308 may allow for a plurality of scan points to be returned through the range of azimuth and elevation angles covered by the optical scanner 301. In order to collimate the plurality of optical beams 308, a beam collimator, such as a collimating lens, may be used to collimate individual ones of the optical beams 308 to generate the optical scanning beam 304.

In some embodiments, the signal processing system 303 may include a processing device 360 and/or a memory 330 for processing the baseband signal 314. Processing device 360 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 360 may also include one or more special-purpose processing devices such as an application specific integrated circuit (ASIC), a field programmable gate array (FPGA), a digital signal processor (DSP), network processor, or the like.

Memory 330 may include volatile memory devices (e.g., random access memory (RAM)), non-volatile memory devices (e.g., flash memory) and/or other types of memory devices. In some embodiments, memory 330 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 330 may be configured for long-term storage of data and may retain data between power on/off cycles of the LIDAR system 300A. In some embodiments, the memory 330 may be a static random access memory (SRAM), though the embodiments of the present disclosure are not limited to such a configuration.

As a result of processing the baseband signal 314 from the return beam 313, the signal processing system 303 may generate a plurality of data points 340A (also referred to herein as points). Each of the points 340A may represent a return value associated with an optical signal returned from the target 312 in the FOV. The points 340A may be a digital object that may be stored, for example, in the memory 330. The points 340A that are retrieved and/or generated based on processing the baseband signal 314 of the LIDAR system 300A may be referred to herein as local points 370. The term "local" in the local points 370 is not intended to limit the interpretation of the points 340A in any way, but instead is merely used to indicate that the local points 370 are generated based on optical scanning beam 304, as opposed to points 340B which may have been obtained from a second LIDAR system 300B, as will be described herein.

The point 340A may contain one or more metadata 345. For example, FIG. 3 illustrates representative metadata 345 that includes metadata 1 to metadata N, as an example embodiment of a point 340A. The metadata 345 associated with a given point 340A may describe and/or represent a spatial location of a portion of the target 312 detected by at least one of the scanning beams 304. In addition to information about the estimated location (e.g., an X, a Y, and/or a Z coordinate within the FOV, a velocity associated with the point, etc.) of the portion of the target 312, the metadata 345 may also contain information that describes the spatial location (e.g., an intensity of the light detected by the LIDAR system 300A, a timestamp, etc.) as well as information related to the acquisition of the point 340A (e.g., data associated with the LIDAR system 300A at the time of the acquisition of the point 340A, an azimuth of the point collection, an elevation of the point collection, a data packet associated with the point 340A, whether the point 340A was interpolated, etc.). In some embodiments, the point 340A may contain 256 bytes or more of data.

In some embodiments, the metadata 345 of one or more of the points 340A may include the position 390A of the LIDAR system 300A at the time of collection, which may be obtained by positioning system 309. The positioning system 309 may be configured to provide a position 390A (e.g., a geographic location) of the LIDAR system 300A, or other sensor inputs. In some embodiments, the positioning system

309 may process satellite-based navigation location data (e.g., from global positioning system) to provide a precise global position 390A. Though illustrated as part of the LIDAR system 300A, embodiments of the present disclosure are not limited to such a configuration. In some embodiments, the LIDAR system 300A may be configured to obtain a position 390A of the LIDAR system 300A by contacting another device. For example, if the LIDAR system 300A is installed in a vehicle, the LIDAR system 300A may be configured to query a GPS of the vehicle to find location data that may otherwise be provided by the positioning system 309 to determine the position 390A of the LIDAR system 300A.

In addition to the local points 370, the LIDAR system 300A may be configured to acquire additional auxiliary points 375 from other LIDAR systems 300, such as second LIDAR system 300B illustrated in FIG. 3. In some embodiments, the auxiliary points 375 may contain a plurality of data points 340B not locally generated by the first LIDAR system 300A. That is to say that the points 340B of the auxiliary points 375 may not have been generated based on optical scanning beam 304 from the first LIDAR system 300A. Instead, the points 340B may have been provided by a second LIDAR system 300B. In some embodiments, a format of the auxiliary points 375 may be the same or similar as a format of the local points 370. For example, both the points 340A of the local points 370 and the points 340B of the auxiliary points 375 may contain a same or similar format of metadata 345. However, the embodiments of the present disclosure are not limited to such a configuration. In some embodiments, the auxiliary points 375 may have a different format than the local points 370, and the signal processing system 303 may be configured to convert between the different formats.

A point sharing engine 380 may be configured to request the auxiliary points 375 from the second LIDAR system 300B. For example, both the first LIDAR system 300A and the second LIDAR system 300B may be coupled to each other (e.g., may be operatively coupled, communicatively coupled, may communicate data/messages with each other) via network 320. Network 320 may be a public network (e.g., the internet), a private network (e.g., a local area network (LAN) or wide area network (WAN)), or a combination thereof. In one embodiment, network 320 may include a wired or a wireless infrastructure, which may be provided by one or more wireless communications systems, such as a WiFi™ hotspot connected with the network 320, Bluetooth, near-field communication (NFC), and/or a wireless carrier system that can be implemented using various data processing equipment, communication towers (e.g., cell towers), etc. In some embodiments, the network 320 may be an L3 network. The network 320 may carry communications (e.g., data, message, packets, frames, etc.) between the first LIDAR system 300A and the second LIDAR system 300B.

In some embodiments, the point sharing engine 380 of the first LIDAR system 300A may be configured to send a request 355 to the second LIDAR system 300B over the network 320. In response to the request 355, the second LIDAR system 300B may send a second point cloud 350B and/or a position 390B of the second LIDAR system 300B to the first LIDAR system 300A. In some embodiments, the second point cloud 350B may be all, or a portion, of the point cloud currently being processed by the second LIDAR system 300B.

The LIDAR system 300A may generate and/or update a point cloud 350A from the local points 370 (e.g., including first points 340A) and the auxiliary points 375 (e.g., including second points 340B). The point cloud 350A may be a digital representation of the target(s) 312 within the FOV of the LIDAR system 300A as detected based on the multiple return beams 313 received from the FOV and based on the auxiliary points 375 and/or the position 390B provided by the second LIDAR system 300B.

As will be described in further detail herein, the point sharing engine 380 of the signal processing system 303, may be configured to analyze the auxiliary points 375 and/or the position 390B received from the second LIDAR system 300B to synchronize the local points 370 with the auxiliary points 375. The position 390B of the second LIDAR system 300B may be determined, by a global positioning system, such as positioning system 309.

Though FIG. 3 illustrates that the position 390B is a separately-provided item in response to the request 355, this is merely an example and is not intended to limit the embodiments of the present disclosure. In some embodiments, the position 390B of the second LIDAR system 300B may be provided in other formats. For example, in some embodiments, the second point cloud 350B and/or the second points 340B from the second point cloud 350B may include positioning information of the second LIDAR system 300B (e.g., as part of metadata 345).

Though FIG. 3 illustrates the first LIDAR system 300A requesting a second point cloud 350B from a second LIDAR system 300B, the embodiments of the present disclosure are not limited to such a configuration. In some embodiments, the first LIDAR system 300A may also be configured to share its first point cloud 350A with the second LIDAR system 300B. For example, the first LIDAR system 300A may receive a request (such as request 355) from the second LIDAR system 300B. Responsive to the request 355, the point sharing engine 380 may be configured to transmit the first point cloud 350A and/or the position 390A of the first LIDAR system 300A to the second LIDAR system 300B (e.g., over network 320). Thus, the first LIDAR system 300A can both receive points 340 and/or position 390 from other LIDAR systems 300, but can also provide points 340A and/or position 390A to other LIDAR systems 300.

Though FIG. 3 describes the sharing of point cloud 350, embodiments of the present disclosure are not limited to sharing a full point cloud 350. In some embodiments, for example, the LIDAR system 300A may request a portion of the full point cloud 350B from the second LIDAR system 300B. Stated another way, the auxiliary points 375 may be less than all of the full point cloud 350B from the second LIDAR system 300B.

In addition, though FIG. 3 illustrates one additional LIDAR system 300B providing points 340 to the first LIDAR system 300A, this is only for ease of description. In some embodiments, the first LIDAR system 300A may request 355 auxiliary points 375 from a plurality of other LIDAR systems 300. Thus, the point cloud 350A generated by the first LIDAR system 300 may be constructed based on local points 370 as well as auxiliary points 375 from a plurality of other LIDAR systems 300.

Figure 4A:
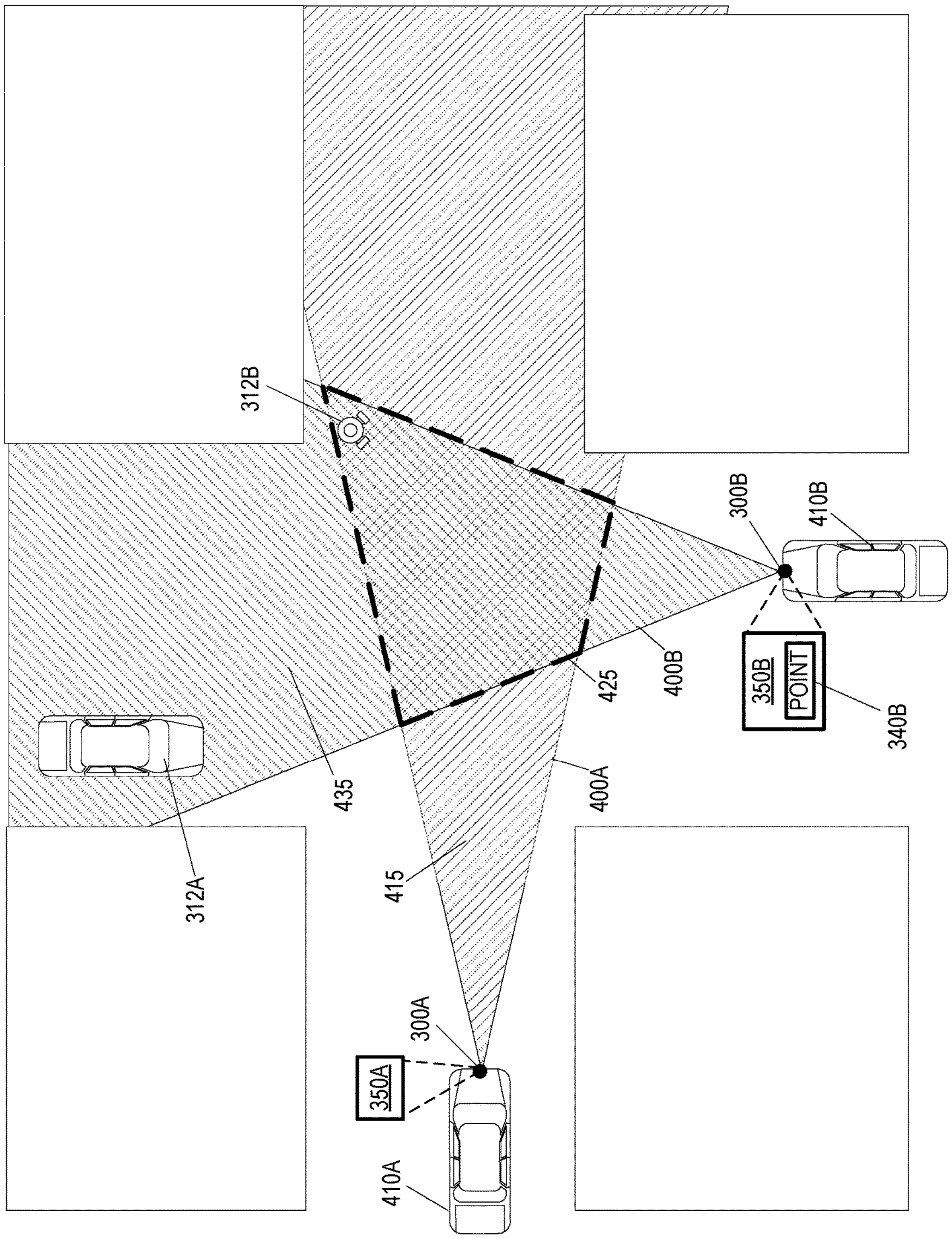
FIG. 4A illustrates challenges that can occur in LIDAR systems, as recognized by the embodiments of the present disclosure

FIG. 4A illustrates challenges that can occur in LIDAR systems 300, as recognized by the embodiments of the present disclosure. Referring to FIG. 4A, a first LIDAR system 300A may be configured to scan a first FOV 400A for a target 312. In some embodiments, the first LIDAR system 300A may be installed and/or present in a first vehicle 410A (e.g., a car). The first LIDAR system 300A may assist in the operation of the first vehicle 410A, such as by scanning for potential obstructions.

As illustrated in FIG. 4A, a second LIDAR system 300B may also be present. The second LIDAR system 300B may be configured to scan a second FOV 400B for a target 312. In some embodiments, the second LIDAR system 300B may be installed and/or present in a second vehicle 410B (e.g., a car), though the embodiments of the present disclosure are not limited to such a configuration. In some embodiments, the second LIDAR system 300B may be a stationary scanning system 300B, a drone scanning system 300B, or other apparatus capable of scanning the second FOV 400B via optical signals to detect targets 312.

In some embodiments, the second FOV 400B may partially overlap the first FOV 400A. Thus, the first FOV 400A of the first LIDAR system 300A may have an overlapping portion 425 that is shared with the second FOV 400B of the second LIDAR system 300B. Other portions of the first FOV 400A may not be shared with the second FOV 400B. For example, the first FOV 400A may have a first portion 425 that overlaps with the second FOV 400B and a second portion 415 that does not overlap with the second FOV 400B. Similarly, the second FOV 400B may have the first portion 425 that overlaps with the first FOV 400A and a third portion 435 that does not overlap with the first FOV 400A.

FIG. 4A illustrates at least two target 312, a first target 312A and a second target 312B. The targets 312 of FIG. 4A are merely examples and are not intended to limit the embodiments of the present disclosure. One of ordinary skill in the art will recognize that more, or fewer, targets 312 may be present, and that the targets 312 may be at different locations. As illustrated in FIG. 4A, the first target 312A may be within the second FOV 400B of the second LIDAR system 300B, but not within the first FOV 400A of the first LIDAR system 300A. For example, the first target 312A may be within the third portion 435 of the second FOV 400B that does not overlap with the first FOV 400A.

As illustrated in FIG. 4A, the second target 312B may be within both the first POV 400A of the first LIDAR system 300A and the second FOV 400B of the second LIDAR system 300B. For example, the second target 312B may be within the overlapping portion 425 of the first and second FOVs 400A, 400B.

Given the example orientation of the first FOV 400A and the second FOV 400B illustrated in FIG. 4A, the second LIDAR system 300B may be able to see and/or scan the first target 312A, while the first LIDAR system 300A may be unable to see and/or scan the first target 312A. Stated another way, since the first target 312A is within the second FOV 400B of the second LIDAR system 300B, a point cloud 350B generated by the second LIDAR system 300B may include at least one point 340B that represent the first target 312A. In contrast, since the first target 312A is not within the first FOV 400A of the first LIDAR system 300A, the first target 31A will not be represented by local points 370 (see FIG. 3) generated by the first LIDAR system 300A in response to its scanning of the first FOV 400A.

By requesting the second point cloud 350B of the second LIDAR system 300B, the first LIDAR system 300A may augment its own first point cloud 350A. Stated another way, the first LIDAR system 300A may be able to expand, enhance, or confirm the first FOV 400A based on sharing points 340B and/or second point cloud 350B from the second LIDAR system 300B.

Figure 4B:
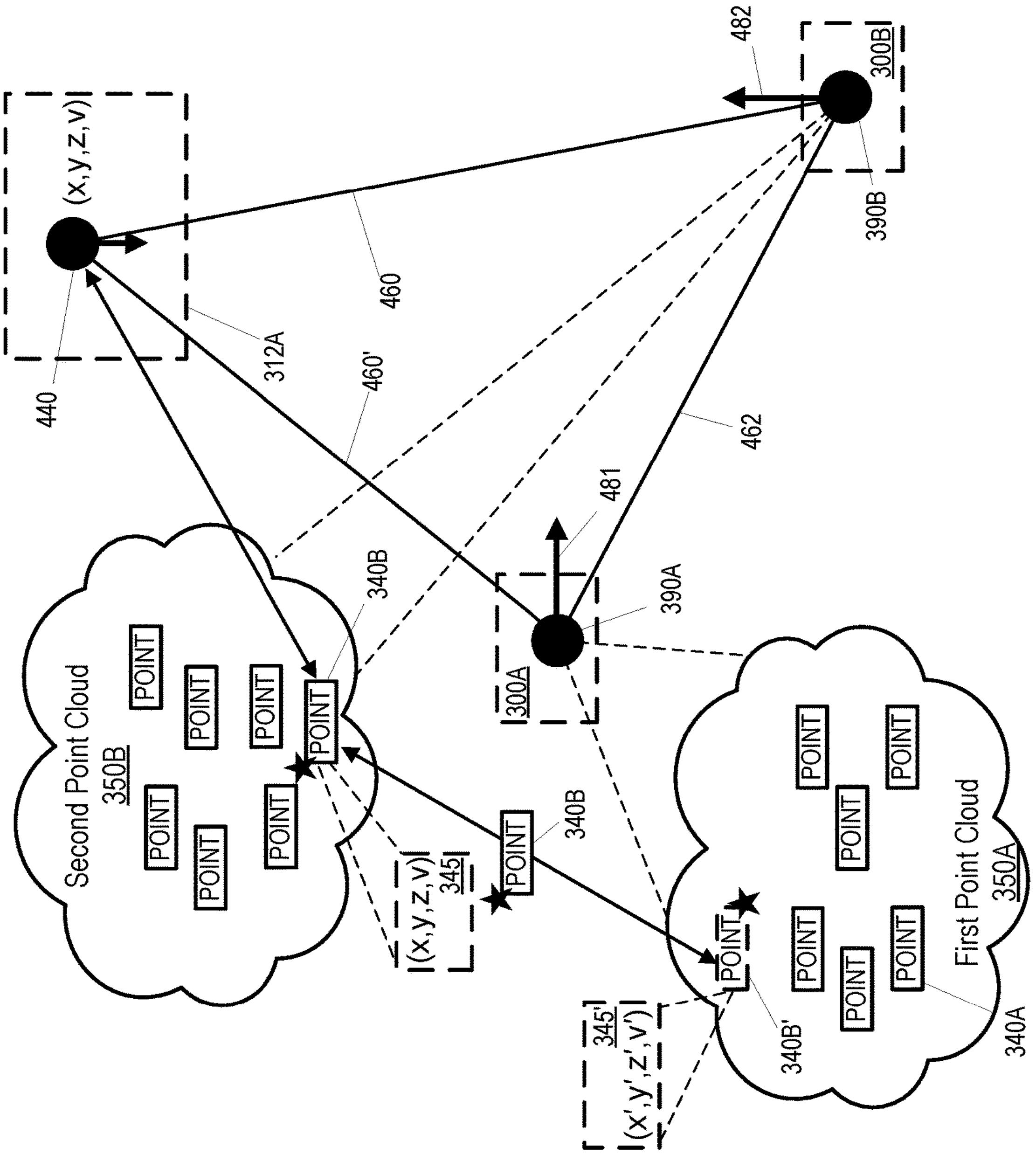
FIG. 4B illustrates an example of sharing a second point cloud with a first LIDAR system, according to some embodiments of the present disclosure.

FIG. 4B illustrates an example of sharing a second point cloud 350B with a first LIDAR system 300A, according to some embodiments of the present disclosure. A description of elements of FIG. 4B that have been previously described will be omitted for brevity.

Referring to FIGS. 4A and 4B, the second LIDAR system 300B may be configured to share a portion of its point cloud 350B, and the first LIDAR system 300A may be configured to utilize the shared portion of the point cloud 350B to augment its own point cloud 350A. For example, FIG. 4B illustrates a scenario in which the first LIDAR system 300A and the second LIDAR system 300B are oriented in a fashion similar to that of FIG. 4A. Namely, a second FOV 400B (see FIG. 4A) of the second LIDAR system 300B may include a first target 312A, while a first FOV 400A of the first LIDAR system 300A does not include the first target 312A.

As a result of the orientations of the first and second LIDAR systems 300A, 300B, the point cloud 350B of the second LIDAR system 300B may include a point 340B (identified with a star in the second point cloud 350B) that corresponds to the first target 312A. In some embodiments, the first LIDAR system 300A may request this point 340B. For example, as described with respect to FIG. 4A, the first LIDAR system 300A may transmit a request 355 to the second LIDAR system 300B. In some embodiments, the request 355 may identify a portion of the second FOV 400B that the first LIDAR system 300A would like to receive, but the embodiments of the present disclosure are not limited to such a configuration. Responsive to the request, the second LIDAR system 300B may transmit all or a portion of its second point cloud 350B to the first LIDAR system 300A.

The first LIDAR system 300A may process the points 340B of the second point cloud 350B to generate transformed points 340B', and add the transformed points 340B' to its first point cloud 350A. As previously described, the points 340 include metadata 345 that may identify a coordinate (e.g., in a 3D space) of the point 340. The coordinate, however, may not be an absolute coordinate of the point 340, but rather a relative coordinate of the point 340 with respect to the LIDAR system 300 that generated the point 340.

For example, as illustrated in FIG. 4B, the point 340B may be associated with and/or identify a location 440 of a portion of the first target 312A to which it corresponds. For example, the location 440 may be identified by metadata 345 of the point 340B. The metadata 345 may identify a relative location of the portion of the first target 312A to which the point 340B corresponds, relative to a position 390B of the second LIDAR system 300B. For example, the metadata 345 may identify an x coordinate, a y coordinate, and a z coordinate of the point 340B, as well as a velocity v of the portion of the first target 312A to which the point 340B corresponds. In some embodiments, the x, y, and z coordinates may be taken relative to the position 390B of the second LIDAR system 300B. The position 390B may be, for example, a location of the optical scanner 301 (see FIG. 3) of the second LIDAR system 300B, though the embodiments of the present disclosure are not limited to such a configuration. In some embodiments, the velocity v may be represented as a vector.

The x, y, z, and v coordinates of the metadata 345 may establish a relative positioning 460 between the position 390B of the second LIDAR system 300B and the portion of the first target 312A to which the point 340B corresponds. As illustrated in FIG. 4B, the metadata 345 may allow for the calculation of the relative positioning 460 so as to locate the portion of the first target 312A to which the point 340B corresponds in 3D space as well as its velocity.

However, in some embodiments, these coordinates of the metadata may not be able to be directly used by the first LIDAR system 300A. For example, the first LIDAR system 300A may be at a different position 390A in space, such that the relative coordinates of the metadata 345 may not be positioned relative to the position 390A of the first LIDAR system 300. As a result, the first LIDAR system 300A may process the point 340B to convert the relative positioning 460 of the portion of the first target 312A to which the point 340B corresponds with respect to the position 390B of the second LIDAR system 300B into a relative positioning 460' of the portion of the first target 312A to which the transformed point 340B' corresponds with respect to the position 390A of the first LIDAR system 300A.

In some embodiments, the relative positioning 460' may be determined by the first LIDAR system 300A by analyzing the position 390B of the second LIDAR system 300B and the position 390A of the first LIDAR system 300A. In some embodiments, the position 390B of the second LIDAR system 300B and the position 390A of the first LIDAR system 300A may be absolute coordinates. By comparing the two positions 390A, 390B, the first LIDAR system 300A may be able to calculate a relative positioning 462 between the first LIDAR system 300A and the second LIDAR system 300B. By determining the relative positioning 462 of the first LIDAR system 300A with respect to the second LIDAR system 300B, a transform may be determined that allows for the conversion of the metadata 345 of the points 340B of the second point cloud 350B relative to the second LIDAR system 300B into transformed metadata 345' of points 340B' of the first point cloud 350A relative to the first LIDAR system 300A. For example, the coordinates x, y, z, and v of the metadata 345 of the point 340B from the second point cloud 350B may be transformed into coordinates x', y', z', and v' of the metadata 345' of the point 340B' within the first point cloud 350A. In some embodiments, the transformation may be calculated geometrically based on the relative positioning 462 between the two LIDAR systems 300A, 300B and the relative positioning 460 between the position 390B of the second LIDAR system 300B and the portion of the first target 312A to which the point 340B corresponds. In some embodiments, the transformation may take into account a first velocity 481 of the first LIDAR system 300A and a second velocity 482 of the second LIDAR system 300B.

The use of the transformation by the first LIDAR system 300A may allow for the points 340B shared by the second LIDAR system 300B to be converted into points 340B' that the first LIDAR system 300B may utilize to generate its point cloud 350A. Since the points 340B are associated with the target 312A that is outside the FOV 400A of the first LIDAR system 300A, this allows the first LIDAR system 300A to augment its point cloud 350A to include points 340B' that are outside its own nominal FOV 400A.

Though only a single point 340B is identified as being associated with the first target 312A in FIG. 4B, this is merely for purposes of description. In some embodiments, multiple points 340B within the second point cloud 350B may correspond to the first target 312A, and may be shared with the first LIDAR system 300A, as described herein. The first LIDAR system 300A may convert each of the additional points to create and/or update the first point cloud 350A.

Figure 4C:
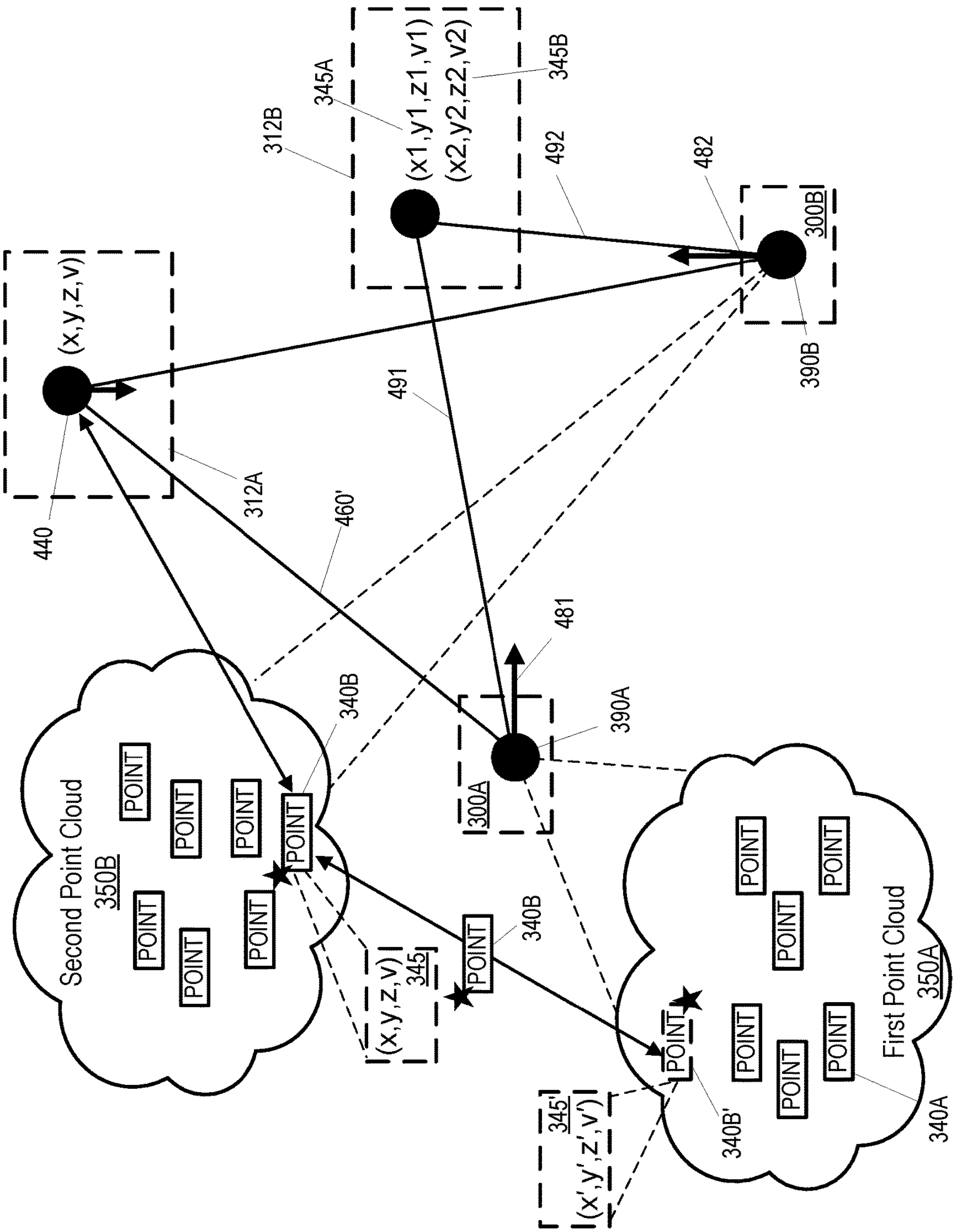
FIG. 4C illustrates an example of sharing a second point cloud with a first LIDAR system utilizing a common reference point, according to some embodiments of the present disclosure.

In FIG. 4B, the transform to convert points from the second point cloud 350B and the first point cloud 350A was based on absolute positioning between the first LIDAR system 300A and the second LIDAR system 300B, but embodiments of the present disclosure are not limited to this configuration. FIG. 4C illustrates an example of sharing a second point cloud 350B with a first LIDAR system 300A utilizing a common reference point, according to some embodiments of the present disclosure. A description of elements of FIG. 4C that have been described in prior figures will be omitted for brevity.

FIG. 4C illustrates a scenario in which the first LIDAR system 300A and the second LIDAR system 300B are oriented in a fashion similar to that of FIG. 4A. Namely, the second FOV 400B (see FIG. 4A) of the second LIDAR system 300B may include a first target 312A and a second target 312B, while the first FOV 400A of the first LIDAR system 300A includes the second target 312B but does not include the first target 312A. As previously described with respect to FIG. 4A, in some embodiments, the first FOV 400A of the first LIDAR system 300A and the second FOV 400B of the second LIDAR system 300B may have an overlapping portion 425 (see FIG. 4A). As a result, both the first point cloud 350A and the second point cloud 350B may have a point 340 representing a portion of the second target 312B.

For example, a first point 340A having first metadata 345A may be associated with the second target 312B in the first point cloud 350A. The first metadata 345A, for example, may include coordinates x1, y1, z1, and v1, for the respective x, y, and z location coordinates and the velocity vector. The first metadata 345A may establish a first relative positioning 491 between the first LIDAR system 300A and the first point 340A associated with the second target 312B.

A second point 340B having second metadata 345B may be associated with the second target 312B in the second point cloud 350B. The second metadata 345B, for example, may include coordinates x2, y2, z2, and v2, for the respective x, y, and z location coordinates and the velocity vector. The second metadata 345B may establish a second relative positioning 492 between the second LIDAR system 300B and the second point 340B associated with the second target 312B. The first and second metadata 345A, 345B may be different since the respective points may be scanned from the different positions 390A, 390B of the first and second LIDAR systems 300A, 300B.

In some embodiments, the first and second LIDAR systems 300A, 300B may communicate with one another to identify the overlapping portion 425 (see FIG. 4A) of their relative FOVs 400. In some embodiments, the communication may identify the overlapping portion 425 based on the second target 312B that is common to both FOVs 400. In some embodiments, the first and second LIDAR systems 300A, 300B may be configured to identify the overlapping portion 425 based on their positioning system 309. For example, the first and second LIDAR systems 300A, 300B may each recognize that based on their position 390 and direction of travel they have overlapping FOVs 400. In some embodiments, the first and second LIDAR systems 300A, 300B may be configured to analyze their respective point clouds 350 to identify the second target 312B as being common to the overlapping portion 425 of their respective FOVs 400.

After identifying the second target 312B as a common reference point between the first FOV 400A and the second FOV 400B, the first FOV 400A may be configured to determine a transform that allows for the conversion of the metadata 345 of the points 340B of the second point cloud 350B relative to the second LIDAR system 300B into transformed metadata 345' of points 340B' of the first point cloud 350A relative to the first LIDAR system 300A. In some embodiments, the transformation may be calculated geometrically based on the relative positioning 491 between the first LIDAR system 300A and the second target 312B as the reference point and on the relative positioning 492 between the second LIDAR system 300B and the second target 312B as the reference point. In some embodiments, the transformation may take into account a first velocity 481 of the first LIDAR system 300A and a second velocity 482 of the second LIDAR system 300B. As previously described, the use of the transformation by the first LIDAR system 300A may allow for the points 340B shared by the second LIDAR system 300B to be converted into points 340B' that the first LIDAR system 300B may utilize to generate and/or update its point cloud 350A. A duplicate description of this transformation will be omitted for brevity.

Figure 4D:
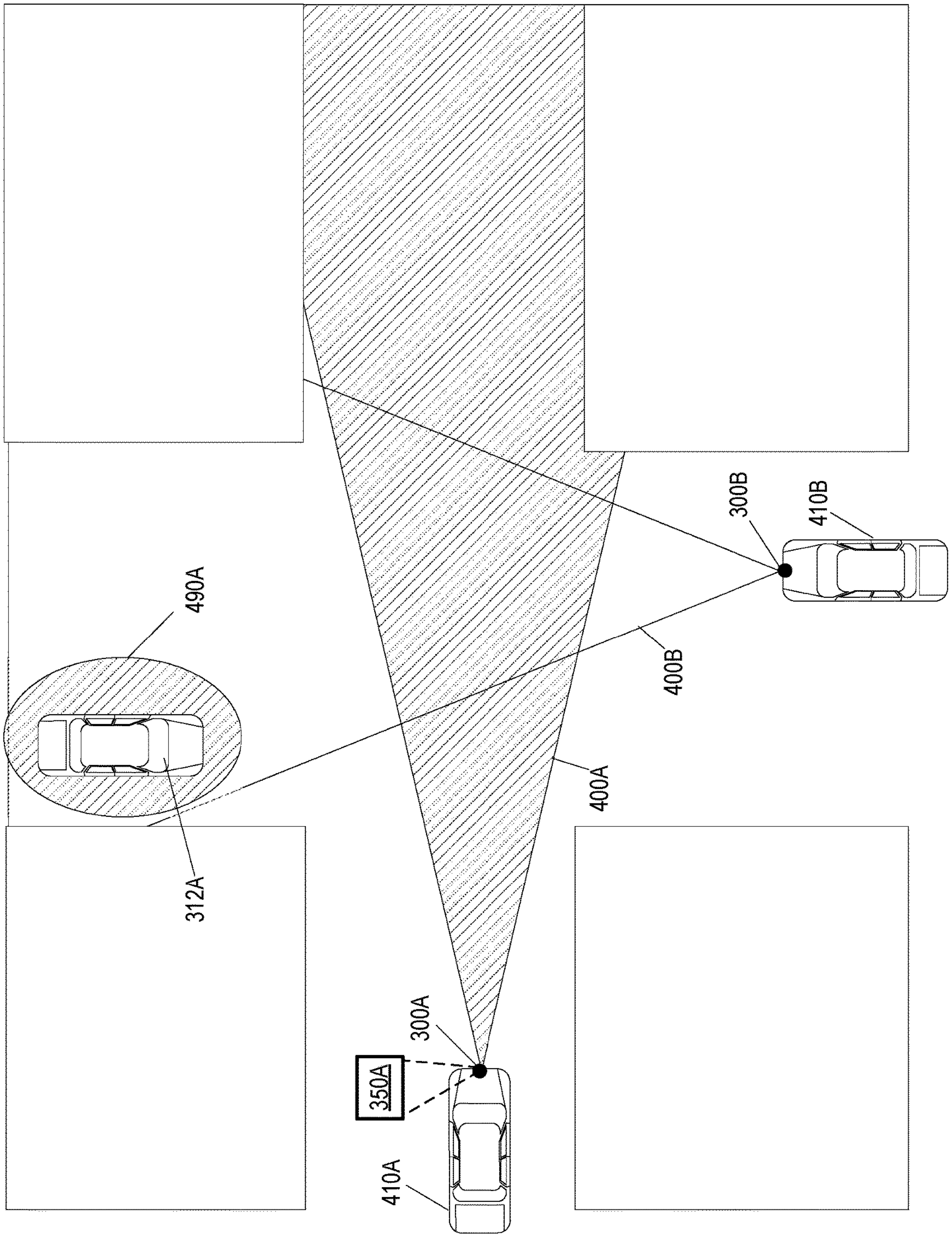
FIG. 4D illustrates an augmented FOV generated by a LIDAR system, according to some embodiments of the present disclosure.

By sharing points 340 from other LIDAR systems 300, the first LIDAR system 300A may be able to augment and/or increase its FOV 400. FIG. 4D illustrates an augmented FOV generated by a LIDAR system 300, according to some embodiments of the present disclosure. A description of elements of FIG. 4D that have been described in prior figures will be omitted for brevity.

By using the additional points 340B from the point cloud 350B of the second LIDAR system 300B, the first LIDAR system 300A is able to generate a first point cloud 350A that includes points 340 that are outside its nominal FOV 400A. The point cloud 350A may include, for example points 340 from the point cloud 350B of the second LIDAR system 300B that are technically obstructed from the view of the first LIDAR system 300A.

Referring to FIG. 4D, the point cloud 350A of the first LIDAR system 300A may therefore include a nominal FOV 400A (e.g., an FOV 400 of the first LIDAR system 300A that would be present if no points were acquired from other LIDAR systems 300) and an extended FOV 490A that includes portions of the point cloud 350A that are generated from points 340 acquired from other LIDAR systems 300 (e.g., auxiliary points 375 of FIG. 3).

By generating the extended FOV 490A, the first LIDAR system 300A may greatly expand its capabilities. For example, as illustrated in FIG. 4D, the first LIDAR system 300A may be able to see otherwise-obstructed targets 312, such as the first target 312A that is around a corner in FIG. 4D. The extended FOV 490A may allow for a much larger point cloud 350A to be generated than would otherwise be possible.

Though FIGS. 4A to 4D illustrate embodiments in which obstructed portions of an FOV 400 may be generated based on shared points 340, the embodiments of the present disclosure are not limited to such a configuration. In some embodiments, the sharing of points 340 between LIDAR systems 300 may also be used to enhance and/or confirm an FOV 400.

Figure 5:
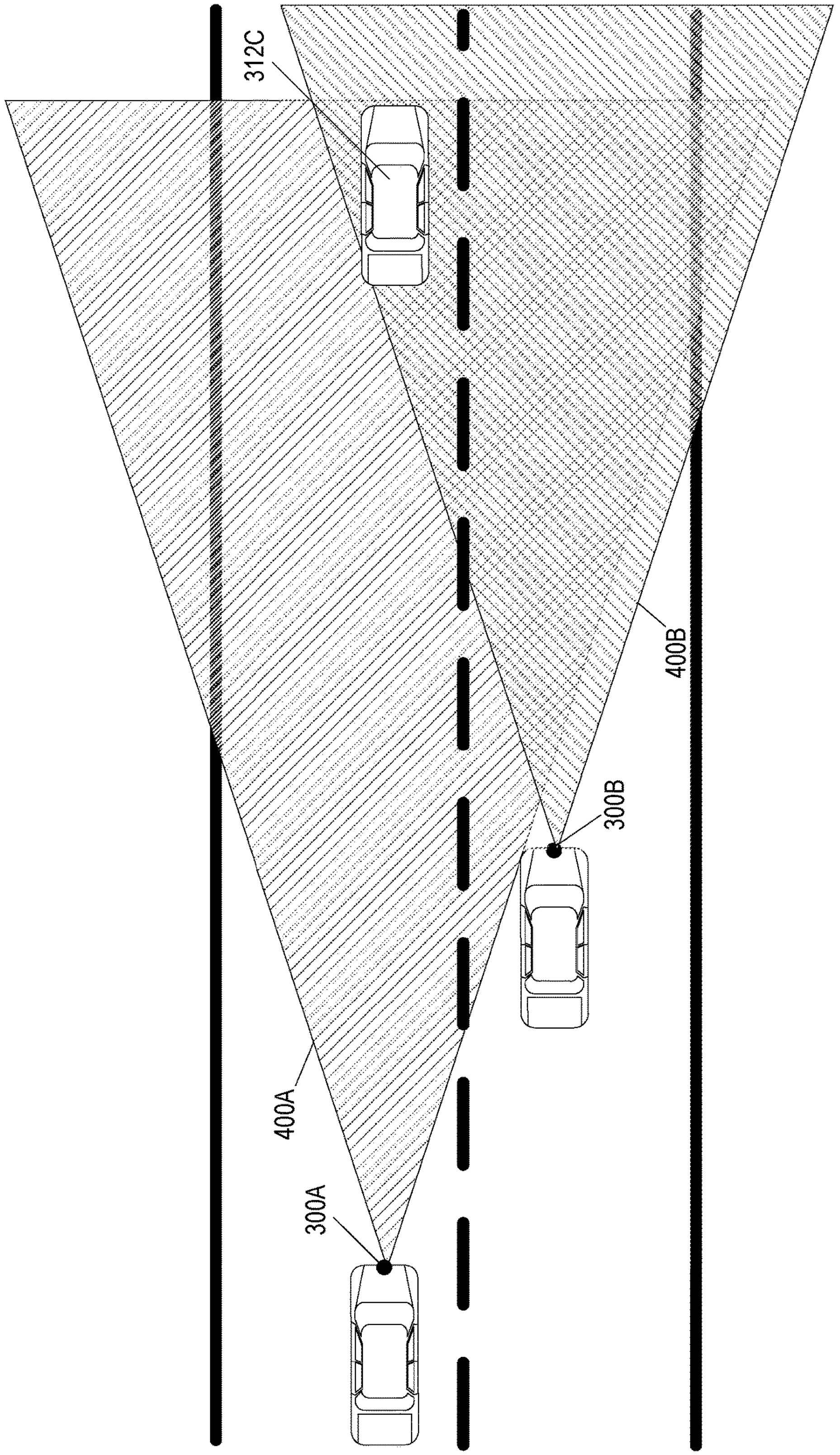
FIG. 5 is a schematic diagram illustrating the use of LIDAR point sharing to confirm an FOV, according to some embodiments of the present disclosure.

FIG. 5 is a schematic diagram illustrating the use of LIDAR point sharing to confirm an FOV 400A, according to some embodiments of the present disclosure. A description of elements of FIG. 5 that have been described in prior figures will be omitted for brevity.

Referring to FIG. 5, a first LIDAR system 300A and a second LIDAR system 300B are illustrated. As previously described, the first LIDAR system 300A may have a first FOV 400A and the second LIDAR system 300B may have a second FOV 400B. In FIG. 5, the first and second LIDAR systems 300A, 300B are illustrated as being mounted in vehicles, but embodiments of the present disclosure are not limited to such a configuration.

In some embodiments, the first FOV 400A of the first LIDAR system 300A may overlap the second FOV 400B of the second LIDAR system 300B. For example, a third target 312C may be present in both the first FOV 400A and the second FOV 400B. By receiving points from the second LIDAR system 300B, utilizing techniques described herein, the first LIDAR system 300A may be able to confirm the presence of the third target 312C in its point cloud 350A. For example, the first LIDAR system 300A may be configured to request the point cloud 350B from the second LIDAR system 300B and extract points 340 from the received point cloud 350B associated with the third target 312C to compare with the points associated with the third target 312C within its own point cloud 350A. In this case, the first LIDAR system 300A may be able to confirm the presence of the third target 312C in its FOV 400A. This may allow the first LIDAR system 300A to configure its calculations and/or scanners, or to otherwise sanity-check its own calculations.

Figure 6:
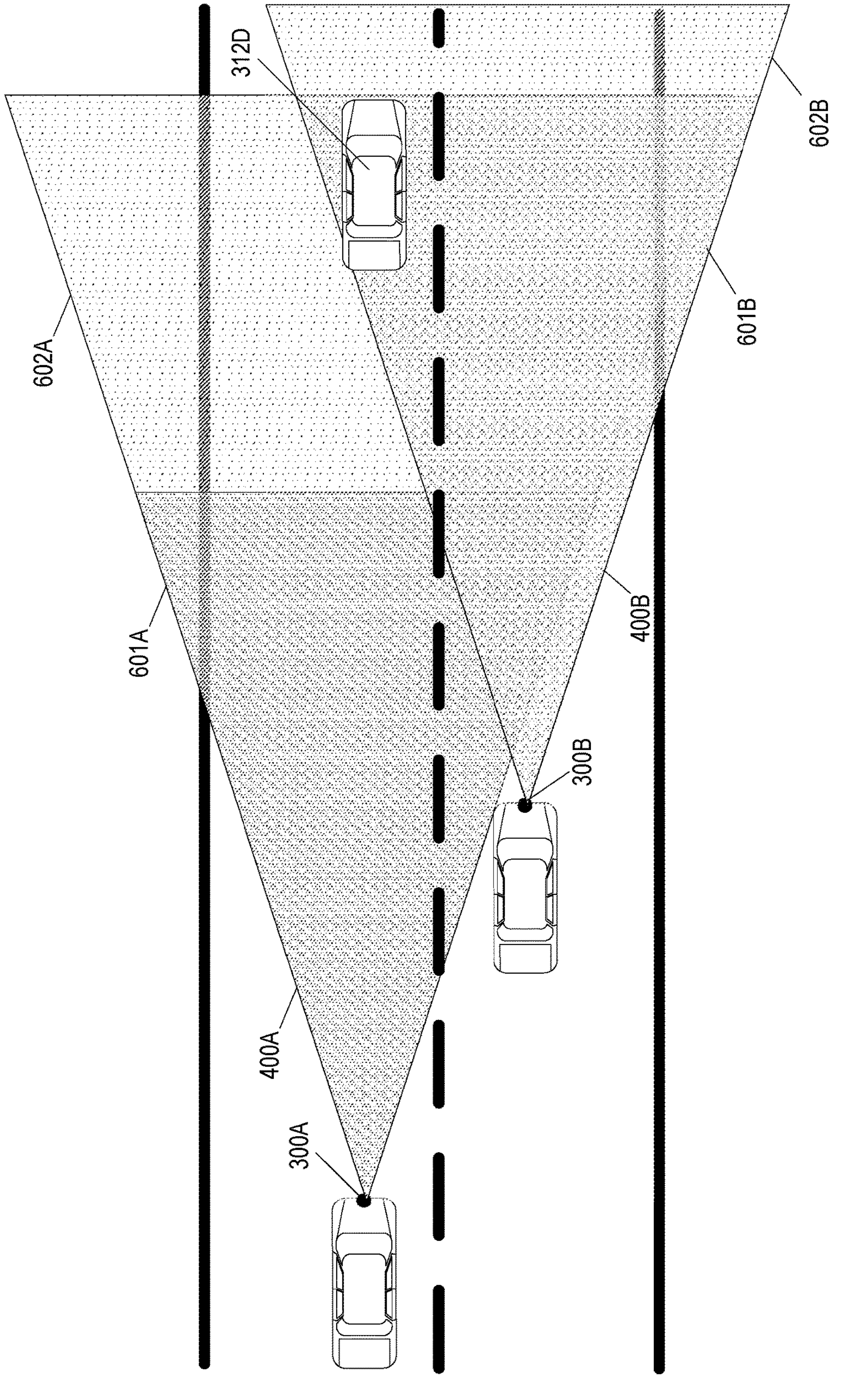
FIG. 6 is a schematic diagram illustrating the use of LIDAR point sharing to enhance an FOV, according to some embodiments of the present disclosure.

FIG. 6 is a schematic diagram illustrating the use of LIDAR point sharing to enhance an FOV 400A, according to some embodiments of the present disclosure. A description of elements of FIG. 6 that have been described in prior figures will be omitted for brevity.

Referring to FIG. 6, a first LIDAR system 300A and a second LIDAR system 300B are illustrated. As previously described, the first LIDAR system 300A may have a first FOV 400A and the second LIDAR system 300B may have a second FOV 400B. In FIG. 6, the first and second LIDAR systems 300A, 300B are illustrated as being mounted in vehicles, but embodiments of the present disclosure are not limited to such a configuration.

In some embodiments, the first FOV 400A may not have a uniform resolution throughout its operating distance. For example, in some embodiments, a first portion 601A of the first FOV 400A may have a first resolution and a second portion 602A of the first FOV 400A may have a second resolution. In some embodiments, the first resolution may be higher than the second resolution. For example, in some embodiments, as a distance of the first FOV 400A increases from the first LIDAR system 300A, a resolution may decrease. In some embodiments, this may be due to noise or other factors that may be worsened by the distance traveled by the optical signals. As a result, the first LIDAR system 300A may have a more detailed view (e.g., more points 340) for objects that are closer to the first LIDAR system 300A than for objects that are farther away from the first LIDAR system 300A.

Similarly, in some embodiments, the second FOV 400B of the second LIDAR system 300B may not have a uniform resolution throughout its operating distance. For example, in some embodiments, a first portion 601B of the second FOV 400B may have a first resolution and a second portion 602B of the second FOV 400B may have a second resolution. In some embodiments, the first resolution of the first portion 601B may be higher than the second resolution of the second portion 602B.

In some embodiments, the first FOV 400A of the first LIDAR system 300A may overlap the second FOV 400B of the second LIDAR system 300B. For example, a fourth target 312D may be present in both the first FOV 400A and the second FOV 400B. However, the fourth target 312D may be present in the first portion 601B (e.g., the higher resolution portion) of the second FOV 400B but in the second portion 602A (e.g., the lower resolution portion) of the first FOV 400A. Stated another way, while the fourth target 312D may be within the FOVs 400 of both the first LIDAR system 300A and the second LIDAR system 300B, the fourth target 312D may be closer to the second LIDAR system 300B. As a result, the second LIDAR system 300B may have more points 340 that correspond to the fourth target 312D within its point cloud 350B.

By receiving points from the second LIDAR system 300B, utilizing techniques described herein, the first LIDAR system 300A may be able to enhance its point cloud 350A to include more points 340 associated with the fourth target 312D. For example, the first LIDAR system 300A may be configured to request the point cloud 350B from the second LIDAR system 300B and extract points 340 from the received point cloud 350B to increase the number of points 340 associated with the fourth target 312D within its own point cloud 350A. In this case, the first LIDAR system 300A may be able to enhance its FOV 400A beyond what would be possible without the point sharing.

Figure 7:
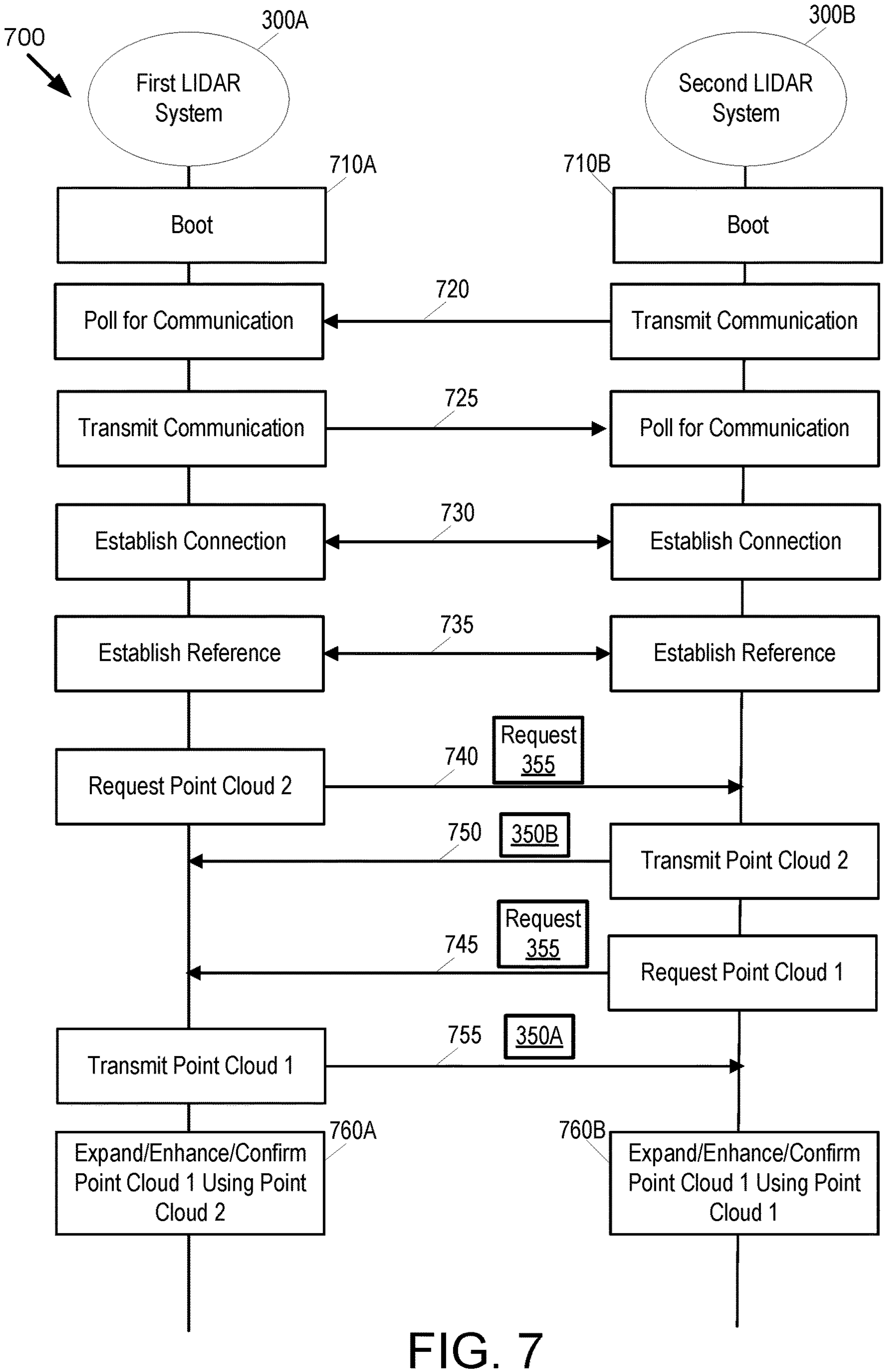
FIG. 7 is a flow diagram of a method for sharing point clouds between LIDAR systems, in accordance with some embodiments of the present disclosure.

FIG. 7 is a flow diagram of a method 700 for sharing point clouds 350 between LIDAR systems 300A, 300B, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of the method 700 may be performed by a computing device (e.g., LIDAR control systems 110 illustrated in FIG. 1).

FIG. 7 illustrates operations of a first LIDAR system 300A and a second LIDAR system 300B, as described herein. Referring simultaneously to the previous figures as well, the method 700 begins at block 710. Block 710 includes a boot operation 710A performed by the first LIDAR system 300A and a boot operation 710B performed by the second LIDAR system 300B. During the boot operation 710, the first and second LIDAR systems 300A, 300B may initialize their operations and/or beginning scanning an environment for targets. Booting 710 may include, for example, determining a position 390 (see FIG. 3) of the first LIDAR system 300A and/or the second LIDAR system 300B. The position 390, for example, may be determined through the use of satellite systems or other positioning mechanisms.

At block 720, the first LIDAR system 300A may begin to poll for communication. As some point after the first LIDAR system 300A begins polling for communication, the second LIDAR system 300B may transmit a communication to the first LIDAR system 300A. In some embodiments, the communication may be transmitted over network 320 (see FIG. 3). As a non-limiting example, the first LIDAR system 300A may be mounted to a vehicle and may begin operating and polling for communications when the vehicle begins traveling. At some subsequent point, the second LIDAR system 300B may come within range of the first LIDAR system 300A and transmit a communication 720 to the first LIDAR system 300A.

Similarly, at block 725, the second LIDAR system 300B may begin to poll for communication. As some point after the second LIDAR system 300B begins polling for communication, the first LIDAR system 300A may transmit a communication to the second LIDAR system 300B. In some embodiments, the communication may be transmitted over network 320 (see FIG. 3).

At block 730, the first LIDAR system 300A and the second LIDAR system 300B may establish a connection. The first and second LIDAR systems 300A, 300B may exchange initialization information over the connection. As non-limiting examples, first and second LIDAR systems 300A, 300B may exchange information related to compatibility of the underlying hardware of the LIDAR system 300 (e.g., version numbers and/or hardware information), location information (such as position 390), velocity (such as velocities 481, 482 of the LIDAR system 300), and the like. As part of establishing the connection, the first and second LIDAR systems 300A, 300B may communicate the ability to share points 340 and/or point clouds 350.

At block 735, the first and second LIDAR systems 300A, 300B may establish a reference point. In some embodiments, establishing a reference point may include sharing an absolute position of one or more of the first and second LIDAR systems 300A, 300B. For example, the first and second LIDAR systems 300A, 300B may transmit their position 390 (e.g., as obtained from the positioning system 309) to one another. In some embodiments, the first and second LIDAR systems 300A, 300B may share information about their FOVs, and may determine whether an overlap 425 (see FIG. 4) exists between the FOV 400A of the first LIDAR system 300A and the FOV 400B of the second LIDAR system 300B. In some embodiments, the reference point may be a shared target within an overlapping portion of the respective FOVs 400 of the LIDAR systems 300, as described herein with respect to FIG. 4C.

At block 740, the first LIDAR system 300A may request the point cloud 350B from the second LIDAR system 300B. In some embodiments, the request of operation 740 may be similar to request 355 described herein with respect to FIG. 3. Responsive to the request of operation 740, the second LIDAR system 300B may transmit its point cloud 350B to the first LIDAR system 300A at block 750. Though the full point cloud 350B is illustrated in FIG. 7, it will be understood that, in some embodiments, only a portion that is less than all of the point cloud 350B may be transmitted.

At block 745, the second LIDAR system 300B may request the point cloud 350A from the first LIDAR system 300A. In some embodiments, the request of operation 745 may be similar to request 355 described herein with respect to FIG. 3. Responsive to the request of operation 745, the first LIDAR system 300A may transmit its point cloud 350A to the second LIDAR system 300B at block 755. Though the full point cloud 350A is illustrated in FIG. 7, it will be understood that, in some embodiments, only a portion that is less than all of the point cloud 350A may be transmitted.

At block 760, the first and second LIDAR systems 300A, 300B may utilize the point clouds 350 obtained from the other respective LIDAR system 300 to expand, enhance, or confirm their point clouds 350 and/or FOV 400. For example, the first LIDAR system 300A may utilize the point cloud 350B from the second LIDAR system 300B to expand, enhance or confirm its point cloud 350A and/or its FOV 400A, as described herein, at least, with respect to FIGS. 4A to 4D. As another example, the second LIDAR system 300B may utilize the point cloud 350A from the first LIDAR system 300A to expand, enhance or confirm its point cloud 350B and/or its FOV 400B, as described herein, at least, with respect to FIGS. 4A to 4D.

Figure 8:
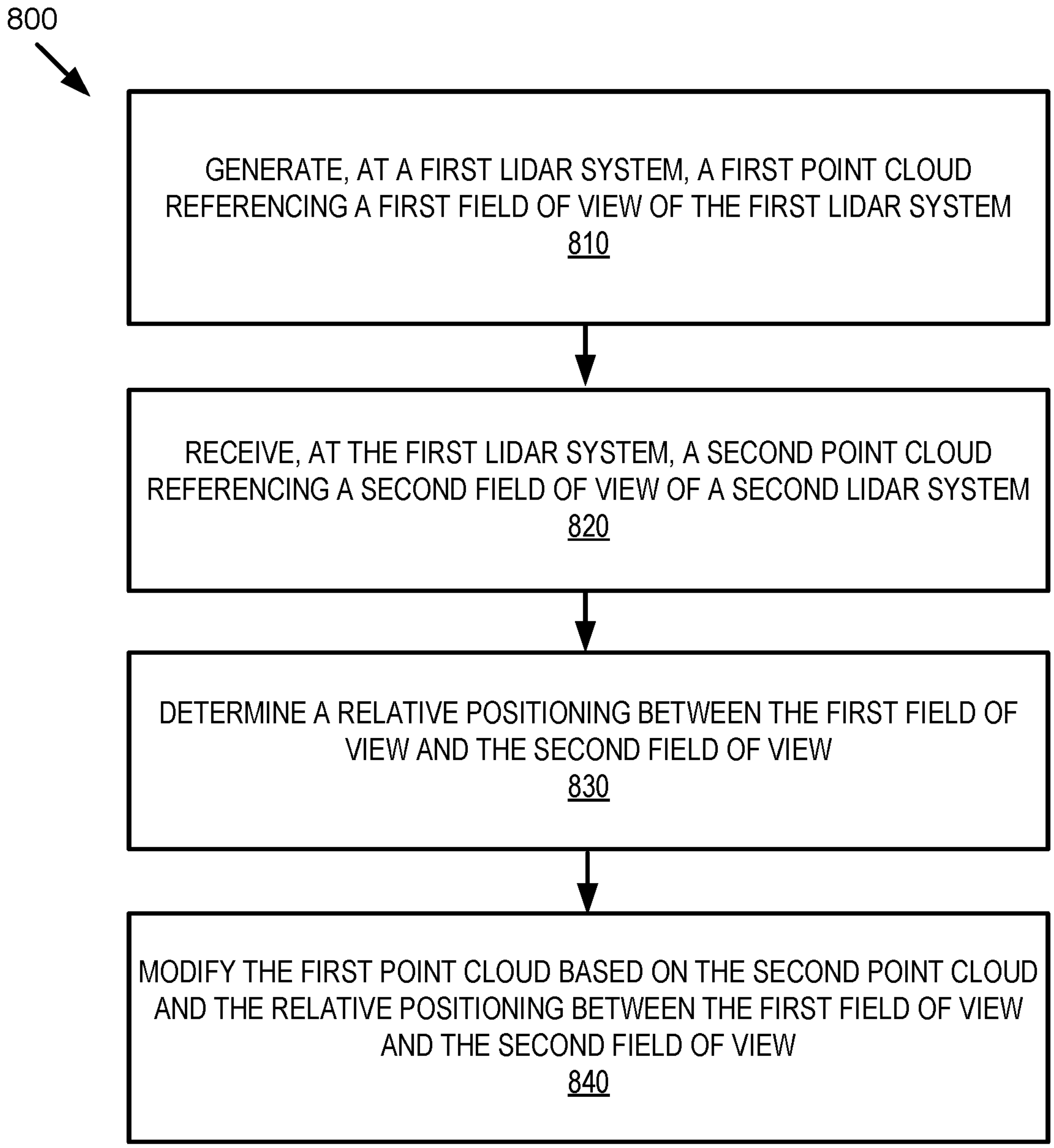
FIG. 8 is a flow diagram of a method for operating a LIDAR system, in accordance with some embodiments of the present disclosure.

FIG. 8 is a flow diagram of a method 800 for operating a LIDAR system 300, in accordance with some embodiments of the present disclosure. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of the method 800 may be performed by a computing device (e.g., LIDAR control systems 110 illustrated in FIG. 1 and/or signal processing system 303 of FIG. 3).

Referring simultaneously to the previous figures as well, the method 800 begins at block 810, in which a first point cloud is generated at a first LIDAR system, the first point cloud referencing a first field of view of the first LIDAR system. In some embodiments, the first point cloud may be similar to the point cloud 350 (e.g., first point cloud 350A) described herein. The first LIDAR system may be similar to the LIDAR systems 300 (e.g., first LIDAR system 300A) described herein. The first field of view may be similar to FOV 400 (e.g., first FOV 400A) described herein.

At block 820, a second point cloud is received at the first LIDAR system, the second point cloud referencing a second field of view of a second LIDAR system. In some embodiments, the second point cloud may be similar to the point cloud 350 (e.g., second point cloud 350B) described herein. The second LIDAR system may be similar to the LIDAR systems 300 (e.g., second LIDAR system 300B) described herein. The second field of view may be similar to FOV 400 (e.g., second FOV 400B) described herein. In some embodiments, the second point cloud may be received responsive to a request for the second point cloud from the first LIDAR system.

At block 830, a relative positioning is determined between the first field of view and the second field of view . The relative positioning may be similar to relative positionings 460, 460', 462, 491, 492 described herein (e.g., with respect to FIGS. 4B and 4C). In some embodiments, the method 800 further includes establishing a common reference point between the first point cloud of the first LIDAR system and the second point cloud of the second LIDAR system. In some embodiments, the common reference point may be a target that is present in both FOVs 400 of both LIDAR systems 300. For example, the common references point may be a target 312 that is present in an overlapping portion 425 of the FOVs 400 of the LIDAR systems 300.

In some embodiments, the method 800 further includes obtaining, at the first LIDAR system, a location of the second LIDAR system, and determining the relative positioning between the first field of view and the second field of view is based in part on the location of the second LIDAR system. In some embodiments, the location of the second LIDAR system may be similar to position 390B described herein with respect to FIGS. 4A to 4D. In some embodiments, the location may be provided by a positioning system, such as positioning system 309 described herein. In some embodiments, the positioning system may be a GPS system.

In some embodiments, the method 800 further includes identifying an object present in both the first field of view and the second field of view. In such embodiments, determining the relative positioning between the first field of view and the second field of view is based in part on comparing a first point associated with the object in the first point cloud and a second point associated with the object in the second point cloud.

At block 840, the first point cloud is modified based on the second point cloud and the relative positioning between the first field of view and the second field of view. In some embodiments, modifying the first point cloud includes increasing a number of points associated with an object in the first point cloud based on points associated with the object in the second point cloud. In some embodiments, modifying the first point cloud includes adding points associated with an object to the first point cloud based on points associated with the object in the second point cloud, wherein the object is outside the first field of view of the first LIDAR system.

Figure 9:
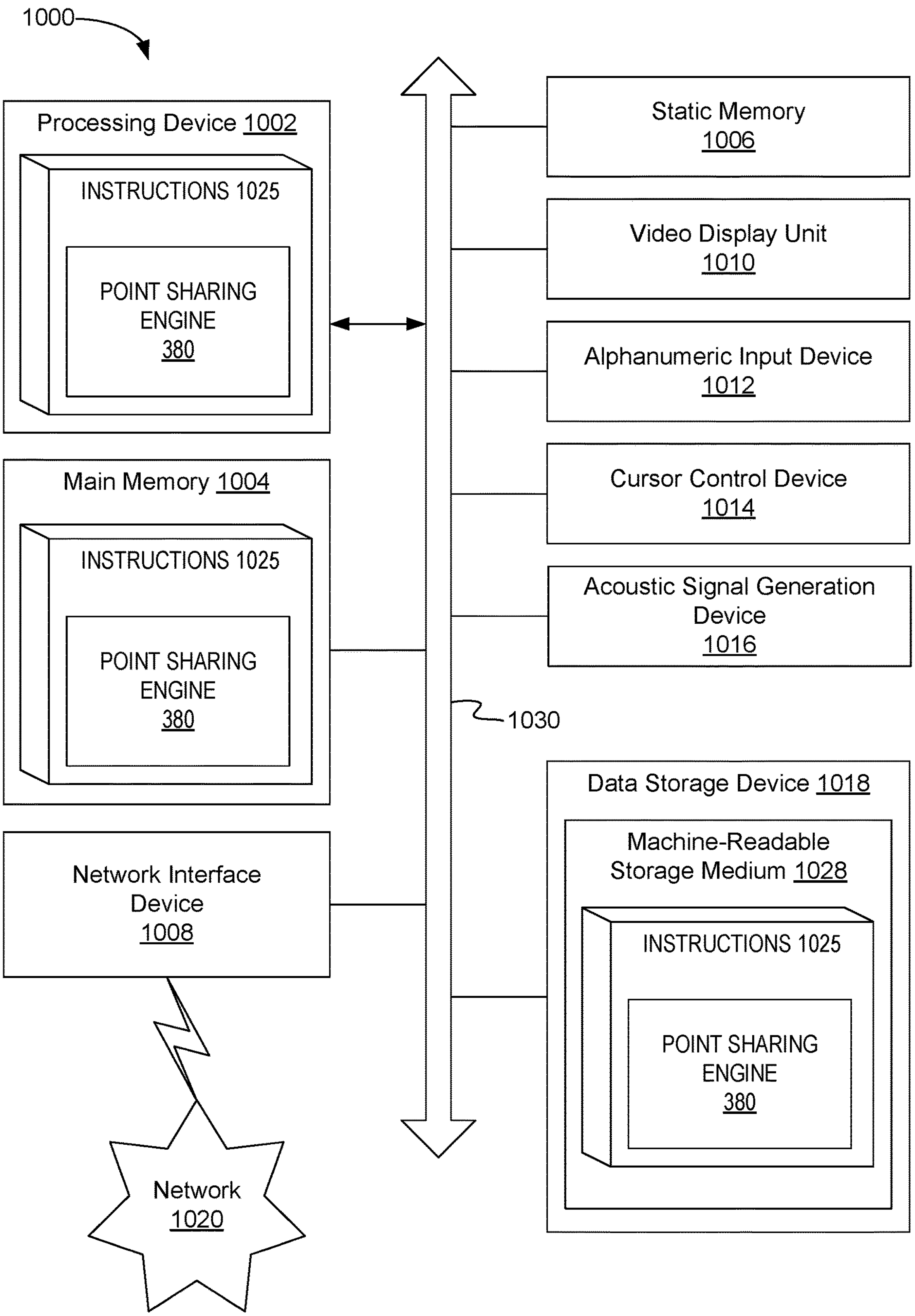
FIG. 9 is a block diagram of an example computing device that may perform one or more of the operations described herein, in accordance with one or more aspects of the disclosure.

FIG. 9 is a block diagram of an example computing device 1000 that may perform one or more of the operations described herein, in accordance with one or more aspects of the disclosure. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also include one or more special-purpose processing devices such as an application specific integrated circuit (ASIC), a field programmable gate array (FPGA), a digital signal processor (DSP), network processor, or the like. The processing device 1002 may execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1025 that may include instructions for a sharing data points of a LIDAR system, e.g., point sharing engine 380, for carrying out the operations described herein, in accordance with one or more aspects of the present disclosure. Instructions 1025 may also reside, completely or at least partially, within main memory 1004 and/or within processing device 1002 during execution thereof by computing device 1000, main memory 1004 and processing device 1002 also constituting computer-readable media. The instructions 1025 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation. As used herein, the term "and/or" includes any and all combinations of one or more of the associated listed items.

What is claimed is:

1. A first light detection and ranging (LIDAR) system, comprising:

an optical source to transmit one or more optical beams towards a first field of view;

an optical receiver to receive one or more return beams corresponding to the first field of view and generate a first point cloud referencing a first field of view of the first LIDAR system;

a processing device; and a memory to store the first point cloud and store instructions that, when executed by the processing device, cause the first LIDAR system to:

receive a second point cloud referencing a second field of view of a second LIDAR system;

determine a relative positioning between the first field of view and the second field of view; and modify the first point cloud based on the second point cloud and the relative positioning by increasing a number of points associated with an object in the first point cloud based on points associated with the object in the second point cloud.

2. The first LIDAR system of claim 1, wherein the processing device is further to obtain a location of the second LIDAR system, wherein the processing device is to determine the relative positioning between the first field of view and the second field of view based in part on the location of the second LIDAR system.

3. The first LIDAR system of claim 1, wherein the processing device is further to identify an object present in both the first field of view and the second field of view.

4. The first LIDAR system of claim 3, wherein the processing device is to determine the relative positioning between the first field of view and the second field of view based in part on comparing a first point associated with the object in the first point cloud and a second point associated with the object in the second point cloud.

5. The first LIDAR system of claim 1, wherein to modify the first point cloud, the processing device is to add points, comprising the at least one point, associated with an object to the first point cloud based on points associated with the object in the second point cloud, and wherein the object is outside the first field of view of the first LIDAR system.

6. The first LIDAR system of claim 1, wherein the processing device is further to establish a common reference point between the first point cloud of the first LIDAR system and the second point cloud of the second LIDAR system.

7. A method comprising:

generating, at a first light detection and ranging (LIDAR) system, a first point cloud referencing a first field of view of the first lidar system;

receiving, at the first LIDAR system, a second point cloud referencing a second field of view of a second LIDAR system;

determining, by a processing device, a relative positioning between the first field of view and the second field of view; and modifying the first point cloud based on the second point cloud and the relative positioning by increasing a number of points associated with an object in the first point cloud based on points associated with the object in the second point cloud.

8. The method of claim 7, further comprising obtaining, at the first LIDAR system, a location of the second LIDAR system, wherein determining the relative positioning between the first field of view and the second field of view is based in part on the location of the second LIDAR system.

9. The method of claim 7, further comprising identifying an object present in both the first field of view and the second field of view.

10. The method of claim 9, wherein determining the relative positioning between the first field of view and the second field of view is based in part on comparing a first point associated with the object in the first point cloud and a second point associated with the object in the second point cloud.

11. The method of claim 7, wherein modifying the first point cloud comprises adding points, comprising the at least one point, associated with an object to the first point cloud based on points associated with the object in the second point cloud, and wherein the object is outside the first field of view of the first LIDAR system.

12. The method of claim 7, further comprising establishing a common reference point between the first point cloud of the first LIDAR system and the second point cloud of the second LIDAR system.

13. A non-transitory computer-readable storage medium including instructions that, when executed by a processing device, cause the processing device to:

generate, at a first light detection and ranging (LIDAR) system, a first point cloud referencing a first field of view of the first lidar system;

receive, at the first LIDAR system, a second point cloud referencing a second field of view of a second LIDAR system;

determine, by the processing device, a relative positioning between the first field of view and the second field of view; and modify the first point cloud based on the second point cloud and the relative positioning by increasing a number of points associated with an object in the first point cloud based on points associated with the object in the second point cloud.

14. The non-transitory computer-readable storage medium of claim 13, wherein the processing device is further to obtain a location of the second LIDAR system, wherein the processing device is to determine the relative positioning between the first field of view and the second field of view based in part on the location of the second LIDAR system.

15. The non-transitory computer-readable storage medium of claim 13, wherein the processing device is further to identify an object present in both the first field of view and the second field of view, and wherein the processing device is to determine the relative positioning between the first field of view and the second field of view based in part on comparing a first point associated with the object in the first point cloud and a second point associated with the object in the second point cloud.

16. The non-transitory computer-readable storage medium of claim 13, wherein to modify the first point cloud, the processing device is to add points, comprising the at least one point, associated with an object to the first point cloud based on points associated with the object in the second point cloud, and wherein the object is outside the first field of view of the first LIDAR system.

17. The non-transitory computer-readable storage medium of claim 13, wherein the processing device is further to establish a common reference point between the first point cloud of the first LIDAR system and the second point cloud of the second LIDAR system.

* * * * *